United States Patent [19]

Mizuno et al.

[11] Patent Number: 5,622,755
[45] Date of Patent: Apr. 22, 1997

[54] PHOTOGRAPHIC FILM CASSETTE

[75] Inventors: Kazunori Mizuno, Kanagawa; Takeshi Nabeta; Mikio Shimizu, both of Tokyo, all of Japan

[73] Assignee: Fuji Photo Film Co., Ltd., Kanagawa, Japan

[21] Appl. No.: 542,702

[22] Filed: Oct. 13, 1995

[30] Foreign Application Priority Data

Oct. 19, 1994 [JP] Japan .................................. 6-253716

[51] Int. Cl.$^6$ .................................................... B32B 1/08
[52] U.S. Cl. .................. 428/35.7; 428/36.8; 428/327; 428/411.1; 428/448; 428/451; 242/118.8; 525/133
[58] Field of Search ................... 242/348.3, 348.4, 242/118.8, 610.6; 525/132, 133, 152, 92 D; 428/36.8, 36.9, 36.91, 327, 448, 451, 515, 66.6, 35.7, 411.1, 906

[56] References Cited

U.S. PATENT DOCUMENTS

| | | | |
|---|---|---|---|
| 3,383,435 | 5/1968 | Cizek | 260/874 |
| 3,960,985 | 6/1976 | Cooper | 525/132 |
| 4,749,737 | 6/1988 | Van Der Meer | 524/267 |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.1 |
| 4,954,838 | 9/1990 | Nakamura et al. | 354/320 |
| 5,040,009 | 8/1991 | Mizuno | 354/275 |
| 5,064,887 | 11/1991 | Yamamoto et al. | 524/492 |
| 5,093,417 | 3/1992 | Sasaki et al. | 525/63 |
| 5,204,395 | 4/1993 | Lupinski | 524/265 |
| 5,206,281 | 4/1993 | Furuta | 524/425 |
| 5,260,110 | 11/1993 | Nichols | 525/516 |
| 5,268,403 | 12/1993 | Sasaki et al. | 524/141 |
| 5,326,813 | 7/1994 | Okada et al. | 525/113 |
| 5,391,467 | 2/1995 | Yoshida et al. | 430/434 |
| 5,418,275 | 5/1995 | Okada et al. | 525/132 |

FOREIGN PATENT DOCUMENTS

| | | | |
|---|---|---|---|
| 0406815A2 | 1/1991 | European Pat. Off. | G03B 17/30 |
| 40-26196 | 11/1940 | Japan . | |
| 43-10362 | 4/1943 | Japan . | |
| WO89/12847 | 12/1989 | WIPO | G03C 3/00 |

*Primary Examiner*—Ellis Robinson
*Assistant Examiner*—Christos Kyriakou
*Attorney, Agent, or Firm*—Sughrue, Mion, Zinn, Macpeak & Seas

[57] ABSTRACT

A pair of flanges are mounted on a spool of a photographic film cassette so as to come into contact with end faces or outermost convolution of a film roll wound on the spool, so that a film leader can be advanced out of the cassette shell by rotating the spool in an unwinding direction. The flanges are formed from a polyphenylene ether group resin composition, which is composed by mixing styrene group resin with polyphenylene ether resin in a weight ratio from 60:40 to 10:90, and mixing 6 to 19 parts by weight of elastomer per 100 parts by weight of said mixture of styrene group resin and polyphenylene ether resin.

7 Claims, 8 Drawing Sheets

PHOTOGRAPHIC FILM CASSETTE

BACKGROUND OF THE INVENTION

1. Field of the Invention

The present invention relates to a photographic film cassette with a flanged spool about which a filmstrip is coiled, and in particular to a film cassette capable of automatically advancing a non-protruding film leader to the outside of the cassette shell responsive to unwinding rotation of the spool. More specifically, the present invention relates to a photographic film cassette in which flanges of the spool have optimum elasticity, durability and film advancing power.

2. Background Art

Recently, film cassettes have been proposed which can be operated to automatically advance a film leader out of the cassette shell by rotating the film spool in the unwinding direction, for example, as disclosed in U.S. Pat. Nos. 4,834,306 and 4,832,275 and EP 0406815 A2. The film leader is non-protruding, i.e. it is located entirely within the cassette shell unless the film cassette is loaded in a camera, film inspector or the like. Therefore, this type of film cassette is convenient and safer to handle both for the user and for photofinisher.

Major elements of the leader-advancing type film cassette such as the cassette shell, the spool, the flanges are formed by resin molding.

The flanges are provided for tightly and neatly winding the filmstrip in a roll on the spool and preventing loosening of the film roll. For example, the flanges are formed as discs having circumferential lips. The respective lips cover lateral sides of the outermost convolution of the film roll to confine it in the radial direction while the flanges confine the film roll in the axial direction.

A separating claw and constraining ribs are formed inside the cassette shell. The separating claw is adapted to peel the film leader, i.e., the end of the outermost convolution of the film roll in the vicinity of a film passage mouth. The constraining ribs constrain the flanges toward the film roll so as to keep the flanges in contact with end faces of the film roll. The constraining ribs opposing to each other in the vicinity of the film passage mouth are spaced from each other a distance to allow the flange, to release the confinement of the film roll so the filmstrip may be unwound and advanced out of the cassette shell after the film leader is peeled by the separating claw.

The above-described members of the film cassette are conventionally formed from high impact polystyrene (HIPS) resin or high density polyethylene resin because of their superior moldability. However, the above-mentioned materials are insufficient for use in practice. Especially for the flanges, because of rubbing against the constraining ribs and the edges of the filmstrip while the spool rotates, the above-mentioned materials are too weak. The flange would quickly be worn out by friction and produce resin particles. The resin particles travel on the filmstrip and damage the camera, the photographic properties of the filmstrip, or images on the filmstrip.

The friction of the flanges and the amount of particles generated are dependent upon distances between the constraining ribs of opposite sides, especially those disposed in the vicinity of the film passage mouth. The distances between the opposing ribs also have influence on film advancing power and durability of the flanges. If the distance is too large, the flanges cannot securely hold or confine the film roll enough to smoothly advance the filmstrip. If the distances are too small, the friction becomes too large and the durability is lowered.

For reliable advance of the filmstrip to the outside, it is desirable to curve the filmstrip in a portion which is guided to the film passage mouth, in the lateral direction of the filmstrip. For this purpose, the lips of the flanges push the lateral edges of the filmstrip toward each other. If the flanges are too soft, the filmstrip will not curve sufficiently. If the flanges are too hard, the filmstrip will curve so much that the filmstrip interferes with the film passage mouth, a film guide surface of the camera, or the like. Also, the friction between the flanges and the filmstrip will increase so much that lowers the durability of the flanges and causes remarkable noise.

Also the flexibility of the filmstrip has influence on film advancing power and durability of the flanges. The film flexibility depends upon the base material, the thickness, the type of the photosensitive emulsion layer, and so forth. Also, the film flexibility varies depending upon the ambient temperature and humidity.

Thermoplastic deformation of the flanges is another problem. In order to make the flanges elastic, the thickness of the flanges should be small. Also for the compactness of the film cassette, thin flanges are desirable. However, the film unit can be left in high temperature circumstances, for example, in a car staying outdoor in summer where the ambient temperature may reach 80° C. The flange made of the above-mentioned material would be thermally deformed in that case.

To solve the above problems, a film cassette has been proposed by the present Applicant, wherein as a material of the flanges, styrene-synthetic rubber copolymer is mixed with modified polyphenylene at a mixture ratio from 3:7 to 8:2.

Indeed this material can improve the durability of the flanges to a certain extent, but the durability is insufficient in view of the expected service conditions of the leader-advancing type film cassette where the filmstrip will be repeatedly withdrawn from and wound into the cassette shell, for example, for exposure, development, inspection, and printing.

OBJECT OF THE INVENTION

A primary object of the present invention is to provide a film cassette which is superior in wearing properties and durability, as well as in film advancing power.

Another object of the present invention is to provide a resin material of the flanges optimized for such a film cassette.

SUMMARY OF THE INVENTION

To achieve the above objects in a photographic film cassette with a spool rotatably mounted in a cassette shell to wind a filmstrip into a roll, and flanges secured to or rotatably mounted on the spool to enable a film leader of the film roll to advance out of the cassette shell by rotating the spool in an unwinding direction, the present invention has flanges from a polyphenylene ether group resin composition which is produced by mixing styrene group resin with polyphenylene ether resin in a weight ratio of styrene group resin to polyphenylenylene resin from 60:40 to 10:90, and mixing 6 to 19 parts by weight of elastomer per 100 parts by weight of the mixture of styrene group resin and polyphenylene ether resin.

The elastomer is preferably at least an elastomer component which is selected among conjugated diene group elastomer, styrene-conjugated diene copolymer elastomer, hydrogenated styrene-conjugated diene copolymer elastomer, ethylene-α-olefin copolymer elastomer, and ethylene-organic acid ester copolymer elastomer.

The material of the flanges has the following physical properties: the elastic modulus in tension in a longitudinal direction is from 105 kg/mm$^2$ to 180 kg/mm$^2$ according to the standard K6732 of JIS (Japanese Industrial Standard), and the folding endurance is 1000 times or more according to the standard P8115 of JIS.

It is preferable that the resin composition as the material of the flanges contains 0.03 to 3 parts by weight of silicone component having an average particle diameter of 20 μm or less, per 100 parts by weight of the polyphenylene ether group resin composition.

The styrene group resin preferably has a weight-average molecular weight from 100,000 to 400,000Mw (measured by GPC: Gas Permeation Chromatography), a molecular weight distribution from 1.5 to 7, an elastic modulus in tension from 120 kg/mm$^2$ to 300 kg/mm$^2$ (JIS-K7113), melt flow rate from 1.0 g to 25 g per ten minutes (JIS-K7210, temperature: 200° C., load: 5 kg).

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
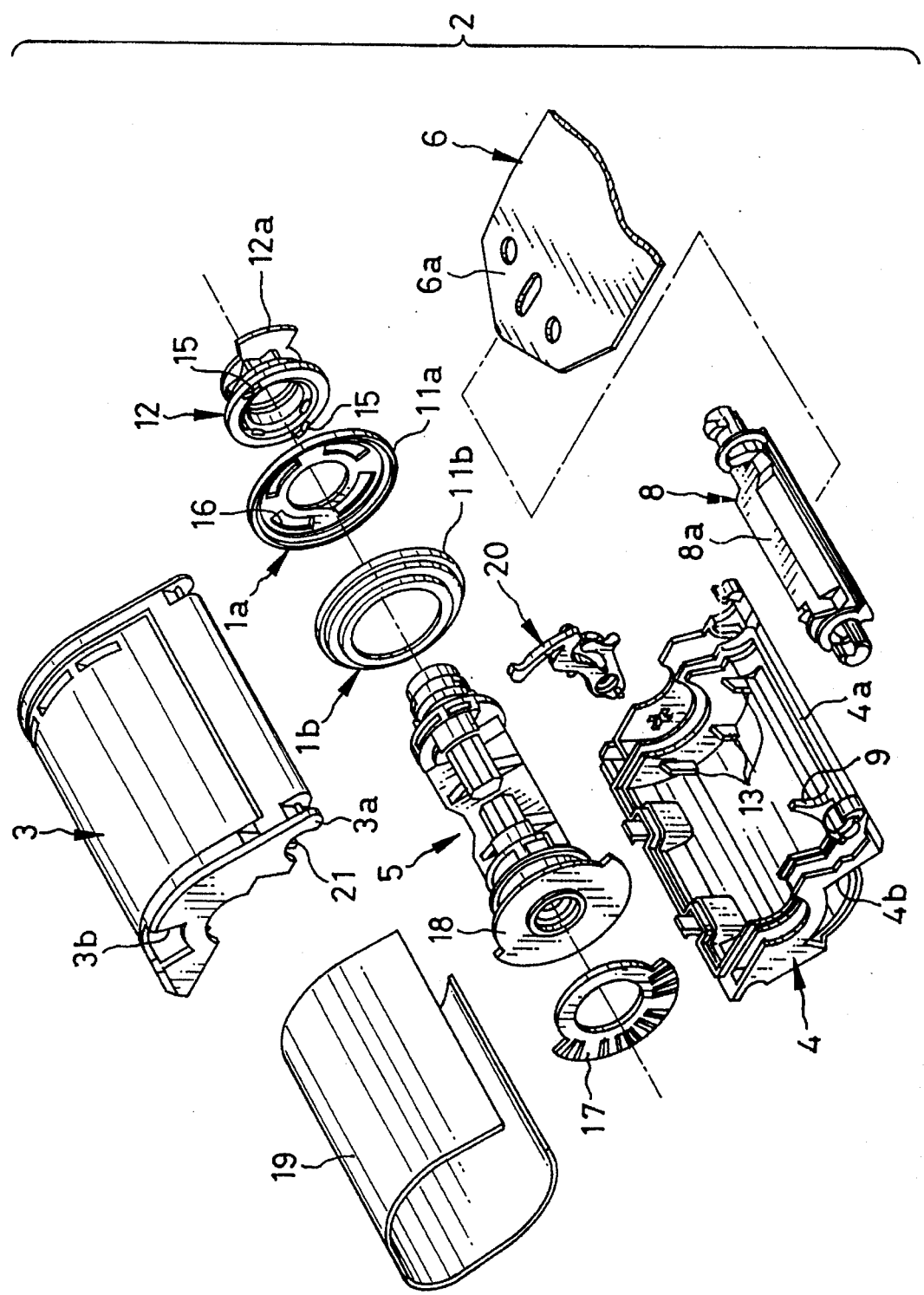
FIG. 1 is an exploded perspective view of a film cassette according to an embodiment of the invention.

FIG. 1 shows an example of film leader advancing type film unit. The film unit has a cassette shell 2 which is constructed by mating approximately semi-cylindrical shell halves 3 and 4 together. A spool 5 is mounted rotatably in the cassette shell 2, and a filmstrip 6 may be coiled about the spool 5 with its trailing end 6a secured to the spool 5. A pair of flanges 1a and 1b are mounted on the spool 5 and spaced a distance in the axial direction of the spool 5.

The base material of the film strip 6 may be triacetate, polyester, polyphenylene naphthalate, or polycarbonate, and has a thickness from 0.07 mm to 0.15 mm. A photosensitive emulsion layer is applied on the base material according to the type of the filmstrip 6 such as a color negative film, a color reversal film or a black-and-white film. If necessary, a backing layer is applied on the opposite side of the emulsion layer. The backing layer may be a magnetic and/or protection layer of nitro cellulose, diacetyl cellulose, triacetyl cellulose, butylar resin, gelatin, polycarbonate or the like, loaded with antistatic agent, conductive material, lubricant and so forth.

The shell halves 3 and 4 are each formed as a resin molded part. The material of the shell halves 3 and 4 must have a small frictional a resistance against the flanges 1a and 1b. The shell halves 3 and 4 are also required to be sufficiently resistant to impact, and not easily deformable by heat. Preferable examples of the shell material are styrene group resin, polycarbonate resin, ABS resin, polyester resin, nylon resin, modified polyphenylene ether resin, polyacetal resin, polypropylene resin, polyethylene resin, methyl-methacryl resin, Teflon, polyphenylene sulfide resin, or a mixture of these resins.

The shell halves 3 and 4 have respective ports 3a and 4a which protrude outward. A door member 8 is rotatably mounted in a room behind a film passage mouth which is formed between the ports 3a and 4a when the shell halves 3 and 4 are mated together. The door member 8 closes the film passage mouth in a light-tight fashion in its closed position. The door member 8 has a flat surface 8a which serves as a film guide in an open position of the door member 8.

A claw 9 is formed on an inner portion of the port 4a of one shell half 4a, hereinafter referred to as lower shell half 4a. The claw 9 is adapted to separate a film leader from the roll of the filmstrip 6 wound on the spool 5 and guide it to the film guide surface 8a.

Figure 2:
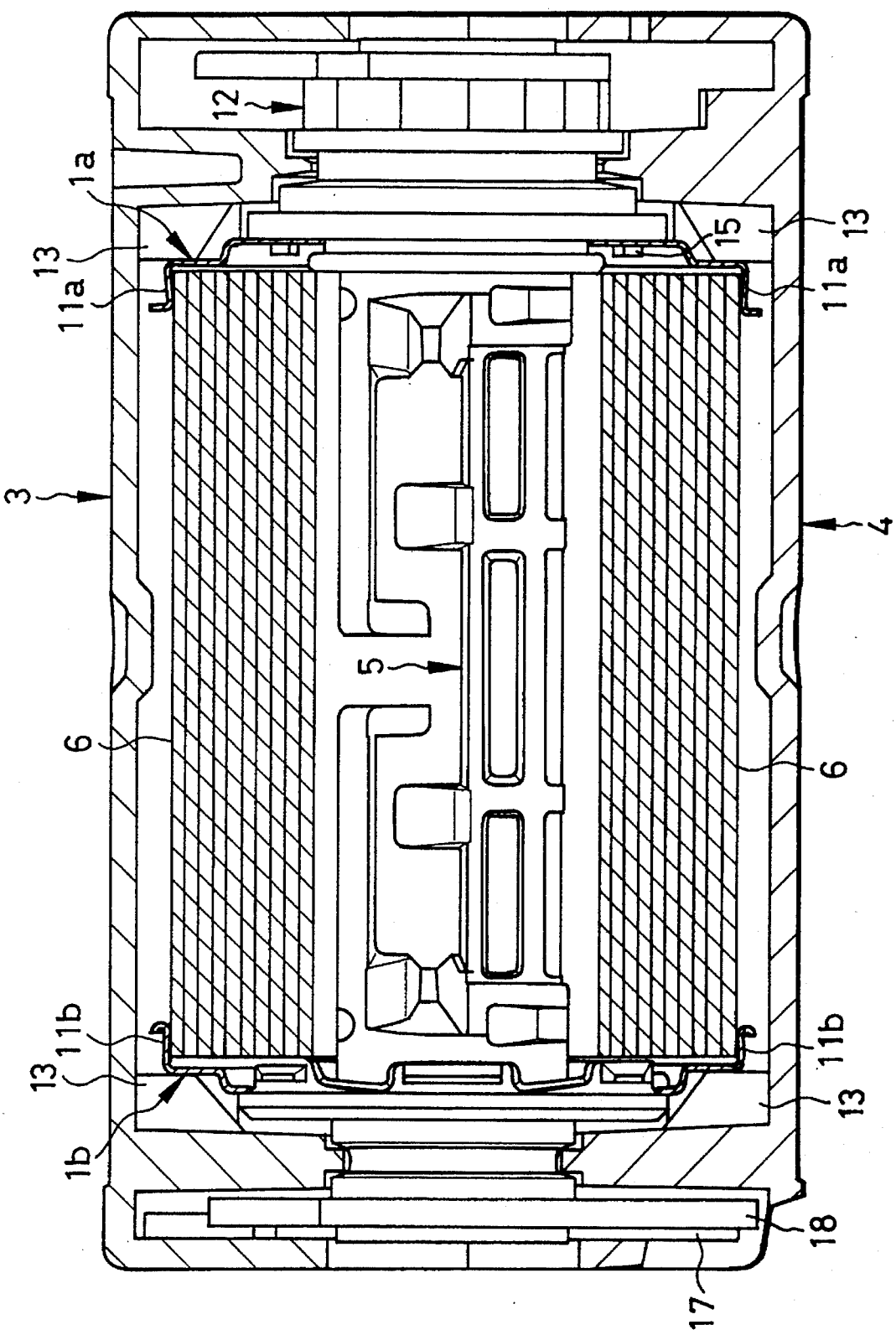
FIG. 2 is a view, partly in section, illustrating the interior of the film cassette.
Figure 3:
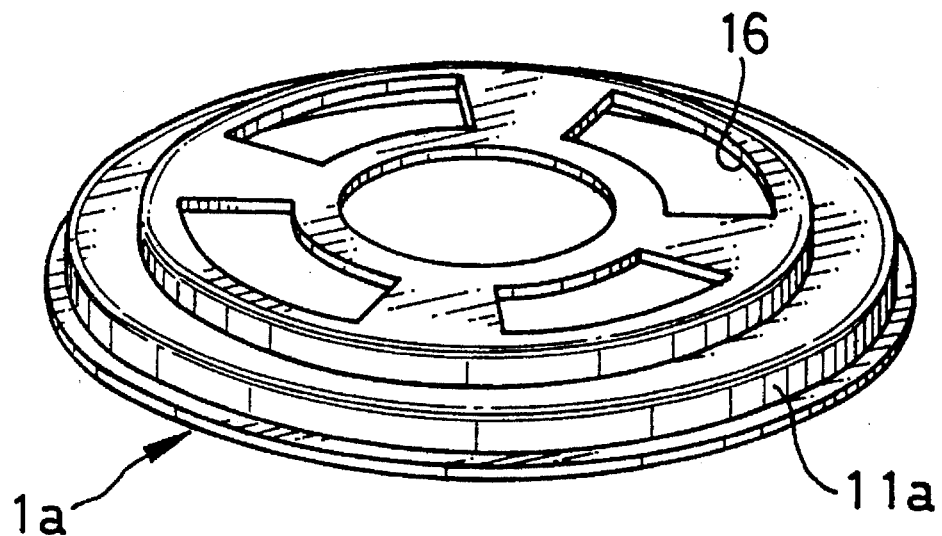
FIG. 3 is a perspective view of a flange of the film cassette shown in FIG. 1.
Figure 4:
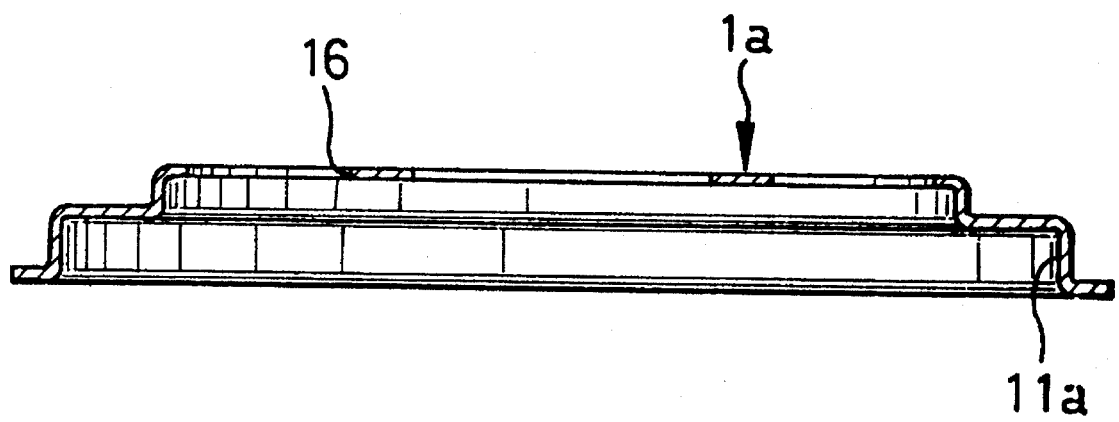
FIG. 4 is a sectional view of the flange.

The flanges 1a and 1b are rotatably and coaxially fitted on the spool 5 so as to confine the axial position of the roll of the filmstrip 6. The flanges 1a and 1b have circumferential lips 11a and 11b formed integrally therewith. As shown in FIG. 2, the lips 11a and 11b protrude axially toward each other to cover or hold lateral edges of the film roll 6. Constraining ribs 13 are formed on insides of end faces of the shell halves 3 and 4, to constrain the flanges 1a and 1b axially inwardly in the shell 2. As shown in FIGS. 3 and 4, one flange 1a has cut-outs 16 around a center hole thereof. When a clutch ring 12 is securely fitted on the spool 5 outside the flange 1a, claws 15 of the clutch ring 12 are inserted in the cut-outs 16. When the spool 5 and thus the clutch ring 12 rotate in a winding direction, the clutch claws 15 slip over the margins of the cut-outs 16, so the flange 1a will not rotate together with the spool 5. When the spool 5 rotates in an unwinding direction opposite to the winding direction, the clutch claws 15 are engaged with the margins of the cut-outs 16, so the flange 1a rotates together with the spool 5.

An indication plate 12a is integrally formed with the clutch ring 12. The indication plate 12a is visible through a window 3b formed through the cassette shell 2 to indicate conditions of use of the film cassette.

A bar code label 17 is stuck on a disc 18 which is securely fitted on the opposite end of the spool 5 from the clutch ring 12. The bar code label 17 has radially arranged bar codes printed thereon. The bar codes are photo-electrically detected through a window 4b formed through the cassette shell 2. The bar codes indicate the type of the filmstrip 6, the number of available exposures and other data. Also a label 19 is stuck on the periphery of the cassette shell 2 to indicate the film type, an identification number of the film cassette, and so forth.

A spool lock member 20 is adapted to lock the spool 5 when the door member 8 is closed. The spool 5 is released from the spool lock member 20 when the door member 8 is opened. A lock pole 21 is formed integrally with the upper shell half 3, to lock the door member 8 in the closed position. The lock of the door member 8 may be released by a mechanism disposed in a camera or a monitor device when the film cassette is placed therein.

Instead of the door member 8, it is possible to provide light-trapping ribbons on inner surfaces of the ports 3a and 4a.

As shown in FIG. 2, the outermost convolution of the film roll 6 is partly covered by the lips 11a and 11b of the flanges 1a and 1b so that the film roll 6 may not get loose. Thus, the film roll 6 rotates together with the spool 5 when the spool 5 rotates in the unwinding direction.

The spacings between the constraining ribs 13 of one lateral side and those of the other lateral side of the cassette shell 2 are defined such that the ribs 13 keep the flanges 1a and 1b in contact with the end faces of the film roll 6. Only the spacing between those ribs 13 which are opposed in proximity to the ports 3a and 4a is made slightly wider so as to allow the filmstrip 6 to push aside the flanges 1a and 1b after the separating claw 9 peels off the film leader. The lips 11a and 11b resiliently push the lateral edges of the filmstrip 6 separating from the roll and pushing aside the flanges 1a and 1b. Thus, the filmstrip 6 is gently curved into a semi-cylindrical shape in the course toward the guide surface 8a, so the filmstrip 6 can smoothly thrust through the film passage mouth between the ports 3a and 4a. The same effect can be achieved by providing the constraining ribs 13 merely on one lateral side of the cassette shell 2.

On the other hand, since the flange 1a is still rotated together with the spool 5 due to engagement between the clutch claws 15 and the cut-outs 16, the advancing power of the flanges 1a and 1b increases when the lips 11a and 11b resiliently push the lateral edges of the filmstrip 6.

Since the trailing end 6a of the filmstrip 6 is secured to the spool 5, the filmstrip 6 is wound into the cassette shell 2 by rotating the spool 5 in the winding direction. While pushing aside the lips 11a and 11b in the vicinity of the ports 3a and 4a, the filmstrip 6 is neatly wound into a roll on the spool 5.

As described so far, the flanges 1a and 1b keep rubbing with the constraining ribs 13 while the spool 5 rotates. Also the lips 11a and 11b are always in contact with the filmstrip 6, and rub with the filmstrip 6 while the filmstrip 6 is advanced out and wound into. Therefore, the flanges 1a and 1b need to have sufficient strength, durability and flexibility.

According to the present invention, the flanges 1a and 1b are formed from a polyphenylene ether group resin composition which is produced by mixing styrene group resin with polyphenylene ether resin in a weight ratio from 60:40 to 10:90, and mixing 6 to 19 parts by weight of elastomer per 100 parts by weight of the mixture of styrene group resin and polyphenylene ether.

As the styrene group resin, high impact polystyrene (HIPS) resin, or a mixture of the high impact polystyrene resin with light-transparent polystyrene resin (styrene monopolymer: GP) is preferable.

The styrene group resin preferably has a weight-average molecular weight from 100,000 to 400,000 Mw (measured by GPC: Gas Permeation Chromatography), more preferably from 120,000 to 300,000, and most preferably from 120,000 to 250,000. Molecular weight distribution of the styrene group resin is preferably from 1.5 to 7, more preferably from 1.8 to 5, and most preferably from 2.0 to 3.5. Elastic modulus in tension of the styrene group resin is preferably from 120 kg/mm$^2$ to 300 kg/mm$^2$ (JIS-K7113), more preferably from 135 kg/mm$^2$ to 275 kg/mm$^2$ and most preferably from 150 kg/mm$^2$ to 200 kg/mm$^2$. Melt flow rate (MFR) is preferably from 1.0 g to 25 g per ten minutes (JIS-K7210, temperature: 200° C., load: 5 kg), more preferably from 1.5 g to 20 g per ten minutes, and more preferably from 2.0 g to 15 g per ten minutes.

As the polyphenylene ether group resin, hereinafter referred to as PPE resin, monopolymer or copolymer disclosed in U.S. Pat. No. 3,383,435 is applicable.

The elastomer is at least an elastomer component which is selected among conjugated diene group elastomers, styrene-conjugated diene copolymer elastomers, hydrogenated styrene-conjugated diene copolymer elastomers, ethylene-α-olefin copolymer elastomers, and ethylene-organic acid ester copolymer elastomers.

Examples of the conjugated diene group elastomer are polymers of butadiene, isoprene, 1,3-pentadiene and 2,3-dimethylbutadiene, and copolymers as the mixtures of these components. As examples of the styrene-conjugated diene copolymer elastomers and the hydrogenated styrene-conjugated diene copolymer elastomers, there are styrene-butadiene random copolymer, styrene-isoprene random copolymer, styrene-butadiene block copolymer, styrene-isoprene block copolymer, and hydrogenated copolymers thereof.

Weight ratio of styrene to conjugated diene in the copolymer is preferably from 10:90 to 85:15, and more preferably from 20:80 to 80:20. Melt flow rate (MFR), as an index of the fluidity of the copolymer, is preferably from 0.01 g to 200 g per 10 minutes (measurement conditions: ASTMD 1238, temperature:200° C., load:5 kg).

As examples of the ethylene- copolymer elastomers, there are ethylene-propylene copolymer, ethylene-1-butene copolymer, and ethylene-1-hexene copolymer. The ethylene- copolymer elastomers preferably has a density from 0.85 g/cm$^2$ to 0.91 g/cm$^2$, and MFR from 0.1 g to 50 g per 10 minutes (measurement conditions: ASTMD 1238, temperature: 190° C., load: 2.16 kg).

As examples of the ethylene-organic acid ester copolymer elastomers, there are ethylene-vinyl acetate copolymer, ethylene-ethyl acrylate copolymer, and ethylene-butyl acrylate copolymer. A preferred weight ratio of ethylene to ethyl acrylate in the ethylene-ethyl acrylate copolymer is from 97:3 to 70:30. The ethylene-organic acid ester copolymer elastomer preferably has a MFR from 0.1 g to 500 g per 10 minutes (measurement conditions: ASTMD 1238, temperature: 190° C., load: 2.16 kg).

It is preferable that the resin composition as the material of the flanges contains 0.03 to 3 parts by weight of silicone component having an average particle diameter of 20 μm or less, per 100 parts by weight of the polyphenylene ether group resin composition.

If necessary, the polyphenylene ether group resin composition may be loaded with additives such as lubricant, antistatic agent, dehydrating agent, light-screen agent, conductive material and so forth. The amount of the additives must be limited to a range wherein the properties of the composition will not remarkably change. The lubricant will reduce the friction between the flanges and the constraining ribs, as well as the friction between the lips and the filmstrip. Accordingly, the lubricant is effective for prevention of wearing of these members, reduction of harmful powders and noises, and improving durability of the film cassette.

As the lubricant, there are higher alcohol ester wax, such as polyethylene, higher fatty acid amid compound, such as oleic acid amid, and erucic acid amid. As the PPE resin in general requires high temperature to form into a web, heat-resistant lubricants are preferable. In view of the friction against the flanges, loading of silicone was found to be preferable, for the first time.

As a result of studies, the most suitable lubricant is a silicone having an average particle diameter of 20 μm or less, as it is dispersible in the mixture of PPE resin with styrene group resin. This silicone is macromolecular dimethyl-polysiloxane having an average particle diameter of 20 μm or less, preferably 15 μm or less, and more preferably 10 μm or less. Above 20 μm, the silicone will lower the physical properties. If the average particle diameter is too small, the silicone will be difficult to disperse uniformly in the resin. Therefore, the average particle diameter is preferably not less than 1 μm, and more preferably 1.2 μm. Loading of the silicone is preferably from 0.03 wt % to 3.0 wt %, and most preferably 0.1 wt % to 2.0 wt %. In the most preferable range, the silicone hardly lowers the physical properties, and sufficiently smooth the resin.

Loading of antistatic agent can improve handling of the flanges in assembling the film cassette, prevent dust adhesion and facilitate removal of the flanges from their molds. Since the flanges are very light, i.e., 10 mg to 40 mg weight, improvement in handling is important for production efficiency.

To achieve the above mentioned effects, it is enough to decrease the surface resistance to $10^{15}\Omega$ or less. Since the surface resistance is about $10^{16}\Omega$, before loading the antistatic agent, almost all kinds of antistatic agents is applicable. However, because of the high temperature necessary for forming a web from the resin, the antistatic agents must not be decomposed at that temperature. Decomposition of the antistatic agents causes foaming in the resin, to deteriorate smoothness of the resin web. As preferred examples of the antistatic agent, built-in antistatic agents as disclosed in "Handbook Gum/Plastic Composition, Revised Version No.2" published by Kabushiki Kaisha Rubber Digest, pp. 381–388.

Loading of light-screen agents is desirable in case extraneous light enters the interior of the cassette shell. If the flanges are transparent, the extraneous light will be reflected from the surface of the flanges to fog the filmstrip. Representative examples of the light-screen agents are as follows:

Inorganic compounds

Oxide: silica, diatomaceous earth, alumina, titanium oxide, iron oxide, zinc oxide, magnesium oxide, stibium oxide, barium ferrite, strontium ferrite, beryllium oxide, pumice, pumice balloon, and alumina fiber;

Hydroxide: aluminum hydroxide, hydroxide, and basic magnesium carbonate;

Carbonate: calcium carbonate, magnesium carbonate, dolomite, and dosonite;

Sulfate and sulfite: calcium sulfate, barium sulfate, ammonium sulfate, and calcium sulfite;

Silicate: talc, clay, mica, asbestos, glass fiber, glass balloon, glass beads, calcium silicate, montmorironite, and bentonite;

Carbon: carbon black, graphite, carbon fiber, and carbon hollow sphere;

Others: iron powder, copper powder, lead powder, tin powder, stainless steel powder, pearl pigment, aluminum powder, aluminum flakes, molybdenum sulfide, boron fiber, silicon carbide fiber, aluminum fiber, stainless steel fiber, nickel fiber, brass fiber, calcium titanate, lead titanate zirconate, zinc borate, barium metaborate, sodium borate, aluminum paste, and talc.

Organic compounds

Wood meal including pine wood meal, oak wood meal and sawdust, hull fiber including almonds lull, peanuts hull and chaff, various kinds of colored fiber including cotton, jute, paper flakes, cellophane flakes, nylon fiber, polypropylene fiber, starch, aromatic polyamide fiber, and so forth.

Among of the above-mentioned light-screen agents, preferred are those inorganic compounds which make the resin opaque. More preferred are light absorbing carbon black, titanium nitride and graphite, as having good heat-resistance and light-resistance and being relatively inactive. The most preferred examples of carbon black classified according to material are gas black, furnace black, channel black, anthracene black, acetylene black, Ketjen carbon black, thermal black, lamp black, oil smoke, pine smoke, animal black, vegetable black and so forth.

According to the invention, furnace carbon black is preferable in view of the light-shielding properties and cost. Disregarding expensiveness, acetylene carbon black, Ketjen carbon black as a by-product of modified carbon black, and conductive carbon black are preferable because of their antistatic effect. It is preferable to mix the former with the latter according to the necessitated properties.

Compounds of light-screen agents may be morphologically classified as follows:

1. Uniformly colored pellet
   one of the most popular light-screen compound referred to as color compound;
2. Dispersible powder
   fine particles known as dry color, formed by atomization after processing with various surface treating agents and adding dispersing agent;
3. Paste
   dispersed plasticizer or the like;
4. Liquid
   liquid known as liquid color, dispersed in surface-active agent or the like;
5. Masterbatch pellet
   light-screen agent dispersed at a high density in a plastic resin to be colored;
6. Wet granular compound
   light-screen agent dispersed at a high density in a plastic resin and granulated;
7. Dry powder
   usual, green, dry powdery compound.

As described above, there are various forms of light-screen compounds, among which masterbatch is preferable in view of cost, prevention of staining the work place. A masterbatching method is disclosed, for example, in JPB 40-26196, wherein polymer/carbon black masterbatch is produced by dispersing carbon black in a solution of polymer in an organic solvent. Also, JPB 43-10362 discloses a method of producing a masterbatch by dispersing carbon black in polyethylene.

Among of the carbon blacks, furnace carbon black of pH 6.0 to 9.0, having an average particle diameter from 10 μm to 120 μm, containing volatile components 2.0 wt % or less, and absorbing oil 50 ml/100 g or more. Because it will cause less fogging on photosensitive materials, has little influence on photosensitivity, and large light-shielding power. In addition, the above furnace carbon black rarely generates hard spots of carbon black, fish-eye or pin-holes in the resin film or web. Also, carbon blacks containing less sulfur, as disclosed in U.S. Pat. No. 5,040,009, are preferable.

According to WO 89/12847, carbon blacks usually contain cyan compound, which is known to have chemical effects on photographic film. Therefore, it is necessary to limit the content of cyan compound in the resin composition to a range so as not to have bad influence on the filmstrip of the film cassette. Such a safe range is generally 3 ppm in carbon black by weight, though it varies depending on the loaded amount of carbon black. The content of cyan compound is measured by the following method:

Hydrogen cyanide, which is generated under reflux of carbon black in the presence of sulfuric acid, is trapped in 0.1N sodium hydroxide water-solution, and is measured in quantity using 4-pyridine carboxylic acid•pyrazolone spectrophotometry. The amount of hydrogen cyanide is converted into ppm units to the weight of carbon black. The content of cyan compound in a carbon black tightly relates to the amount of DBP (dibutyl peroxide) oil absorption of the carbon black. Those carbon blacks whose DBP oil absorption is less than 65 ml/100 g contain cyan compound in a dangerous range to photographic properties. Cyan compound content also has a certain correlation with ash content in carbon. If the ash content is 0.5% or more, the cyan compound content is dangerous to photographic properties.

Accordingly, for the carbon black applicable to the present invention, DBP oil absorption is preferably 65 ml/100 g or more, or ash content is preferably 0.5% or less, and the cyan compound content measured by the above-described method is preferably 2 ppm or less. Commercially available examples of such carbon blacks are Carbon Black CB#950, CB#45 and CB#30B (trade names) produced by Mitsubishi Chemical Co.

Antioxidant is loaded to prevent deterioration of resin and its physical properties. Especially because some elastomer contains unsaturated connecting radical, the resin may be oxidized and decomposed due to high-temperature processing on film-forming and shaping, or bad conditions in preservation. To prevent deterioration, ozone antioxidant is most effective. A concrete example of ozone antioxidant is paraphenylene-diamine derivative. Also, phenol group antioxidant and phosphorus group antioxidant are applicable, of which hindered phenol group antioxidant is preferable.

In addition, various kinds of antioxidant disclosed in "Plastic Data Handbook" published by KK Kogyo Chosa-Kai, pp. 794–799, various kinds of antioxidant disclosed in "Plastic Additives Data" issued by KK Kagaku Kogyo Sha, pp. 327–329, and various kinds of antioxidant disclosed in "Plastic Age Encyclopedia, Advanced Version" issued by KK Plastic Age, pp. 211–212 (1986) may be useful in selecting appropriate kind and loading of the antioxidant, considering potential negative effects on the photographic properties.

In order to avoid negative effects on the photographic film, loading of the antioxidant is preferably from 0.0001 wt % to 1.0 wt %, more preferably from 0.001 wt % to 0.5 wt %, and most preferably from 0.005 wt % to 0.35 wt %.

The material of the flanges has prefereble physical properties: elastic modulus in tension in a longitudinal direction is from 105 kg/mm$^2$ to 180 kg/mm$^2$ according to the standard K6732 of JIS (Japanese Industrial Standard), preferably from 110 kg/mm$^2$ to 170 kg/mm$^2$, and more preferably from 120 kg/mm$^2$ to 160 kg/mm$^2$. Folding endurance according to the standard P8115 of JIS is 1000 times or more, preferably 1100 times or more, and more preferably 1200 times or more. The thickness of the flange material is from 0.1 mm to 0.5 mm, preferably from 0.12 mm to 0.4 mm, and more preferably from 0.13 mm to 0.3 mm.

To produce the resin material in form of a web or film for forming the flanges according to the invention, the styrene group resin, the polyphenylene ether resin and the elastomer are mixed or kneaded by a kneader such as a continuous kneader, and then formed into a web by a sheet extruder, such as a double-screw extruder, or by injection molding.

To form the flanges from the resin film, vacuum forming, air-pressure forming, heat-pressure forming and other forming method are applicable, but the vacuum forming is the best.

Figure 5:
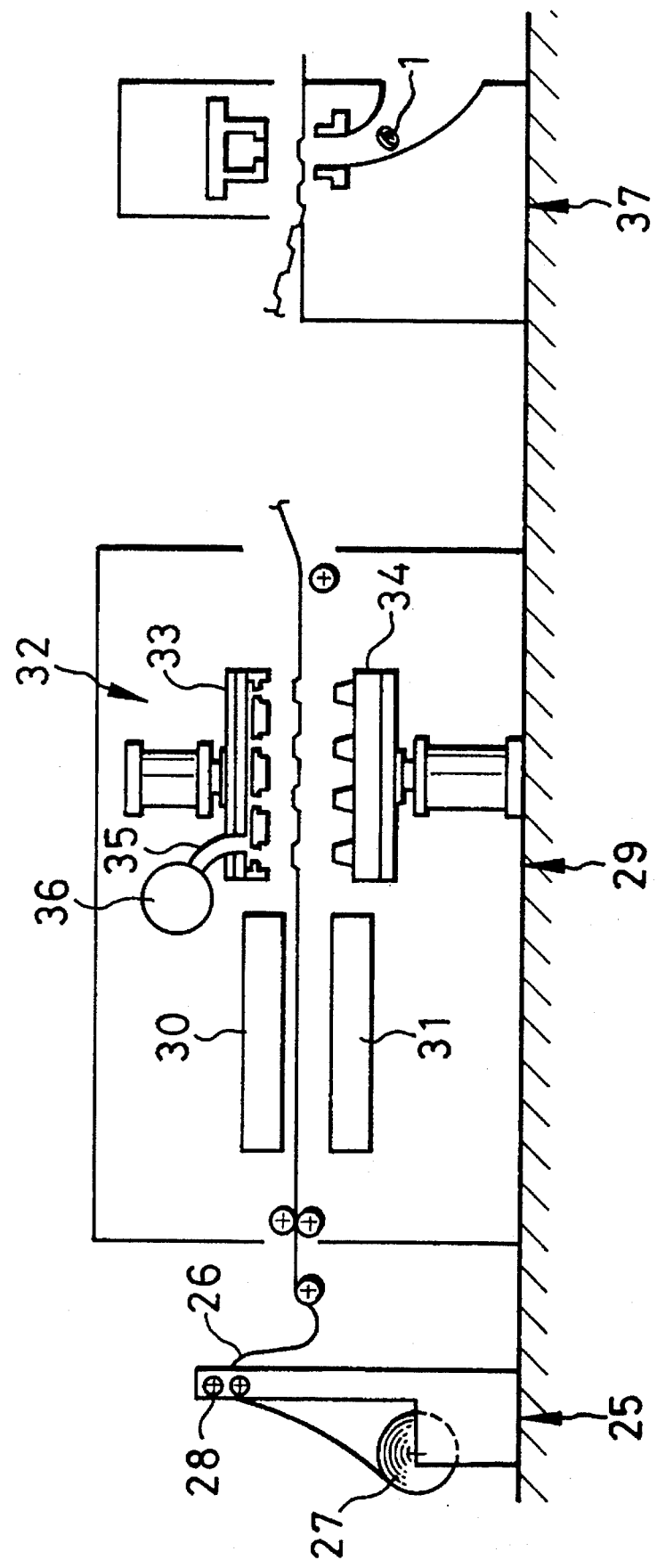
FIG. 5 is a schematic view illustrating the overall construction of a flange manufacturing apparatus.

FIG. 5 shows a preferred example of vacuum forming apparatus for the flange 1. A continuous strip of resin web or film 26 formed as above is wound into a roll 27, and the roll 27 is set in a film feeder 25. The resin web 26 is fed by feed rollers 28 of the film feeder 25 to a vacuum forming machine 29, and heated to be softened by a pair of heaters 30 and 31.

The softened resin web 26 is fed to a shaping section 32 of the vacuum forming machine 29. As the heaters 30 and 31, heated tables or heat radiation members are applicable. The heaters 30 and 31 are preferably disposed near the shaping section 32.

The shaping section 32 is constituted of molds 33, pressure members 34 and a vacuum pump 36 connected to the molds 33 through a suction hose 35. The suction pump 36 sucks the resin web 26 for two seconds, to bring the resin web 26 into tight contact with the molds 33. Thereafter, the pressure members 34 press the resin web 26 onto the molds 33 and eject compressed air toward the resin web 26 to tighten the contact with the molds 33. In this condition, the resin web 26 is cooled, for example, for two seconds. Then, the resin web 26 is sent to a blanking machine 37, which blanks the resin web 26 into the flanges 1.

EXAMPLES

The following examples illustrate the present invention but are not to be construed as limiting the scope of the invention.

EXAMPLE 1

To form the resin material of the flange, 30 parts by weight of a high impact polystyrene resin having a trade name "Denkastyrole HI" (produced by Denki Kagaku Kogyo) as a styrene group resin (hereinafter referred to as PS resin) was mixed with 70 parts by weight of a polyphenylene ether resin (PPE resin) having a trade name "YPX" (Mitsubishi Gas Chemicals Co., Inc.), and 12 parts by weight of styrene-butadien block copolymer elastomer (styrene content: 35 wt %, MFR: 3.0 g per 10 minutes) was mixed with 100 parts by weight of the PS/PPE mixture, and then kneaded into pellets by using a kneader. The pellets were formed into a 0.2 mm tick web by using a sheet extruder.

The resin web or film was rolled to be set in the vacuum forming apparatus as shown in FIG. 5, and heated by the heaters 30 and 31 at 180° C. for two seconds. The softened resin web was shaped by the shaping section 32, and blanked into the flange 1 having the circumferential lip. It is to be noted that the PS resin of this example has an average molecular weight of 200,000 Mw, a molecular weight distribution of 2.3, an elastic modulus in tension of 190 kg/mm$^2$ in the longitudinal direction, and MFR of 3.0 g per 10 minutes.

EXAMPLE 2

In place of styrene-butadiene block copolymer elastomer used in the Example 1, an ethylene-1-buten random copolymer elastomer having a trade name "TAFMER" (produced by Mitsui Petrochemical Co., Ltd.) was used, which has a density of 0.89 g/cm$^3$ MFR of 3.6 g per ten minutes. Others were the same as Example 1.

EXAMPLE 3

In place of styrene-butadiene block copolymer elastomer used in the Example 1, an ethylene-ethylacrylate random copolymer elastomer having a trade name "NUC COPOLYMER" (produced by Nippon Uniker Co.) was used, whose ethylene content is 82 wt % and MFR is 6.0 g per ten minutes. Others were the same as Example 1.

EXAMPLES 4 and 5

The same as Example 1 except the weight ratio of the PS resin to the PPE resin was varied.

EXAMPLES 6 and 7

The same as Example 1 except the weight ratio of the styrene-butadiene block copolymer elastomer.

EXAMPLE 8

2 parts by weight of dimethyl-polysiloxane as a silicone having an average particle diameter of 2 μm were added per 100 parts by weight of the polyphenylene ether group resin composition as composed according to Example 1.

COMPARISONS

To confirm the effects of the present invention, the following referential examples were prepared as comparisons.

Referential Example 1

Styrene-butadiene block copolymer elastomer was excluded. Others were the same as Example 1.

Referential Example 2

The weight ratio of the PS resin to PPE resin was changed to 70:30.

Referential Examples 3 and 4

The weight ratio of the styrene-butadiene block copolymer elastomer was beyond the range as defined by the invention. Others were the same as Example 1.

Table 1 shows test results relating to physical properties, durability and film advancing power of the flanges of the Examples 1 to 8 and the Comparisons 1 to 4 when mounted in the film cassette shown in the drawings, along with the respective compositions. It is to be noted that the web extruding direction was predetermined to be the longitudinal direction of the flange material.

TABLE 1

| UNITS | FORMULA | | | PHYSICAL PROPERTIES | | | |
|---|---|---|---|---|---|---|---|
| | PS RESIN | PPE RESIN | ELASTOMER | DURABILITY | FOLDING ENDURANCE | ADVANCING POWER | ELASTIC MODULUS IN TENSION |
| | parts by weight | | | times | times | g | kgf/mm$^2$ |
| EXAMPLE 1 | 30 | 70 | SB/12 | 510 | 1630 | 380 | 155 |
| EXAMPLE 2 | 30 | 70 | EBU/12 | 528 | 1906 | 369 | 148 |
| EXAMPLE 3 | 30 | 70 | EEA/12 | 567 | 1988 | 335 | 145 |
| EXAMPLE 4 | 40 | 60 | SB/12 | 426 | 1100 | 348 | 145 |
| EXAMPLE 5 | 20 | 80 | SB/12 | 582 | 1879 | 404 | 161 |
| EXAMPLE 6 | 30 | 70 | SB/12 | 312 | 1305 | 405 | 164 |
| EXAMPLE 7 | 30 | 70 | SB/12 | 805 | 2090 | 340 | 140 |
| EXAMPLE 8 | 30 | 70 | SB/12 | 560 | 1550 | 360 | 145 |
| COMPARISON 1 | 30 | 70 | 0 | 53 | 228 | 427 | 176 |
| COMPARISON 2 | 70 | 30 | SB/12 | 116 | 794 | 239 | 137 |
| COMPARISON 3 | 30 | 70 | SB/20 | 1150 | 2800 | 250 | 98 |
| COMPARISON 4 | 30 | 70 | SB/4 | 95 | 850 | 458 | 183 |

In Table 1:

SB: styrene-butadiene block copolymer elastomer

EBU: ethylene-1-butadiene random copolymer elastomer

EEA: ethylene-ethyl-acrylate random copolymer elastomer

Example 8 contains a silicone (dimethyl-polysiloxane).

To test the durability of each samples of the flanges listed in Table 1, a developed photographic filmstrip was used, whose base layer was 90 μm thick and basically made of polyethylene-naphthalate, and which was coated with an emulsion layer used in a color negative film having a trade name "G400" (produced by Fuji Photo Film Co., Ltd.). On an opposite side of the emulsion layer, the base layer was coated with a magnetic layer in which a magnetic material was dispersed in diacetyl cellulose and a smoothing layer on the magnetic layer, and developed by CN-16 type photographic processing. The developed filmstrip of 1.5 m length was entirely wound into the cassette shell. Thereafter, almost the entire length of the filmstrip was advanced out of the cassette shell and then wound back fully into the cassette shell. This reciprocating movement was counted as one unit. The number of times of the reciprocating movement obtained until the film cassette was disabled to wind or unwind, was used to indicate the durability.

To measure the folding endurance, the resin composition film or web was formed by extrusion while applying a load of 1000 g, and then cut into 15 cm width specimens along both longitudinal and lateral directions of the web. Each specimen was folded through an angle of 132° in either direction. The number of times of folding was counted until the specimen was broken. The smaller one of the measured numbers of folding times was adopted as the measurement value.

The film advancing power was measured as a maximum load necessary for advancing the film leader 18 cm out from the cassette shell. The elastic modulus in tension (in the longitudinal direction) was a value measured at a tension speed of 200 mm/minute according to JIS-K6732.

Table 1 shows that the durability increases remarkably with the loading of the elastomer. Considering ordinary service conditions of the film cassette, the durability must be at least 200 times.

Figure 6:
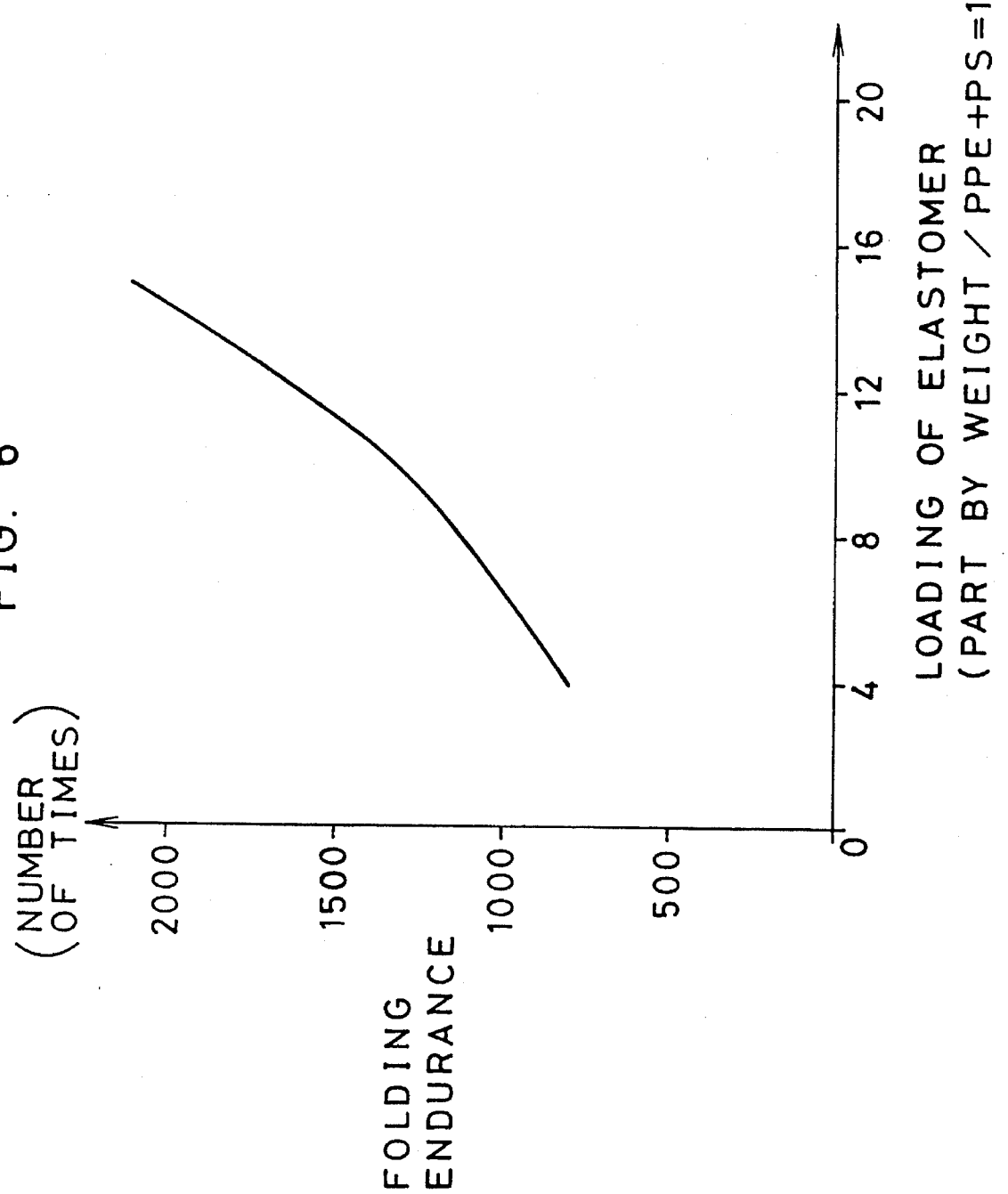
FIG. 6 is a graph showing the relationship between folding endurance of the flange and the loading of elastomer in the material of the flange.

The folding endurance increases substantially proportionally to the loading of the elastomer, as shown in FIG. 6. This is probably because the loading of the elastomer increases the flexibility of the resin and thus the fatigue strength.

If the film advancing power is below 280 g, it is difficult for the film leader to thrust through the film passage or guide surfaces of the camera or the film monitor against the frictional resistance of these surfaces. The film advancing power increases with decreasing elastomer loading, that is, as the stiffness of the resin increases.

Figure 7:
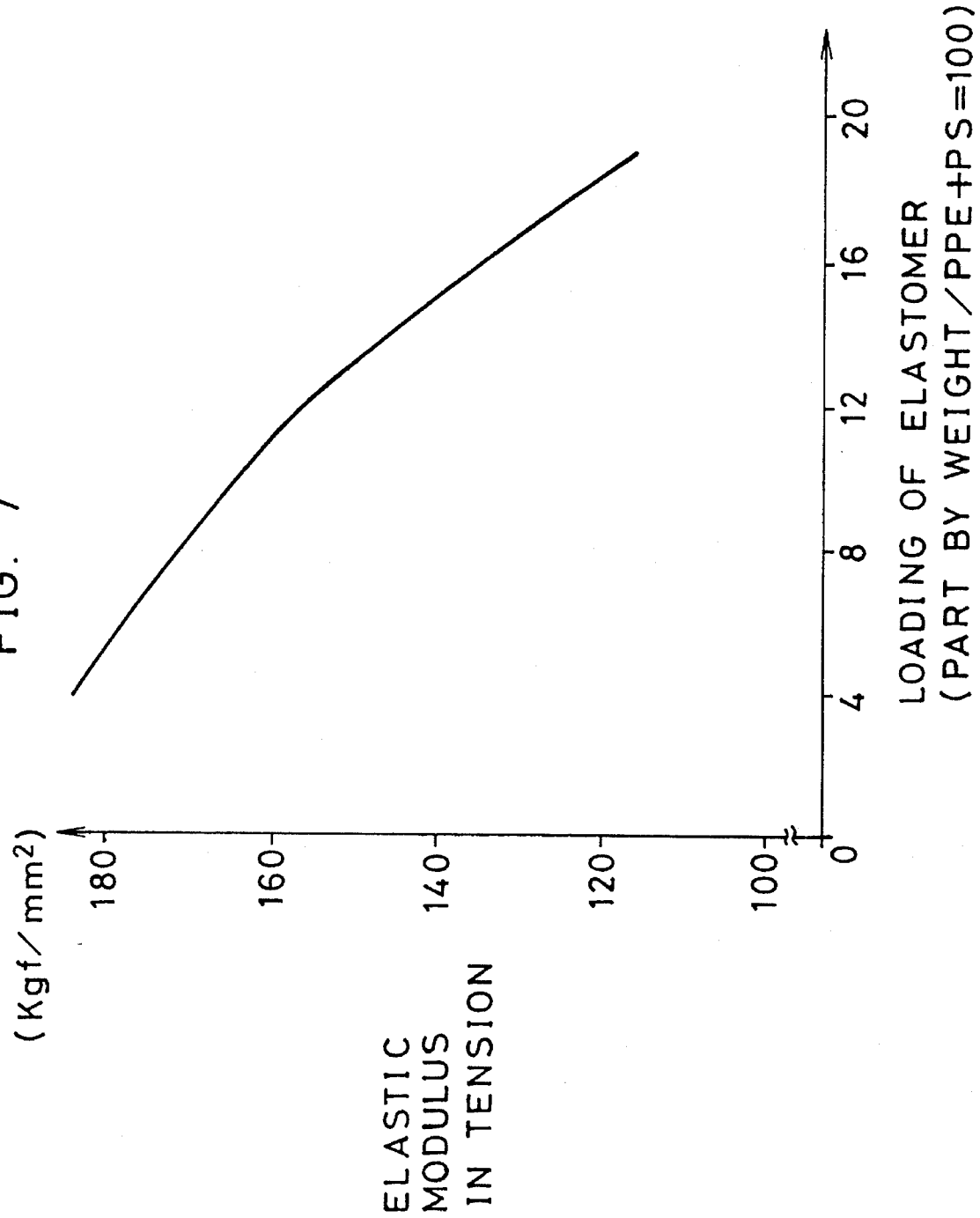
FIG. 7 is a graph showing the relationship between elastic modulus in tension of the flange and the loading of elastomer in the material of the flange.
Figure 8:
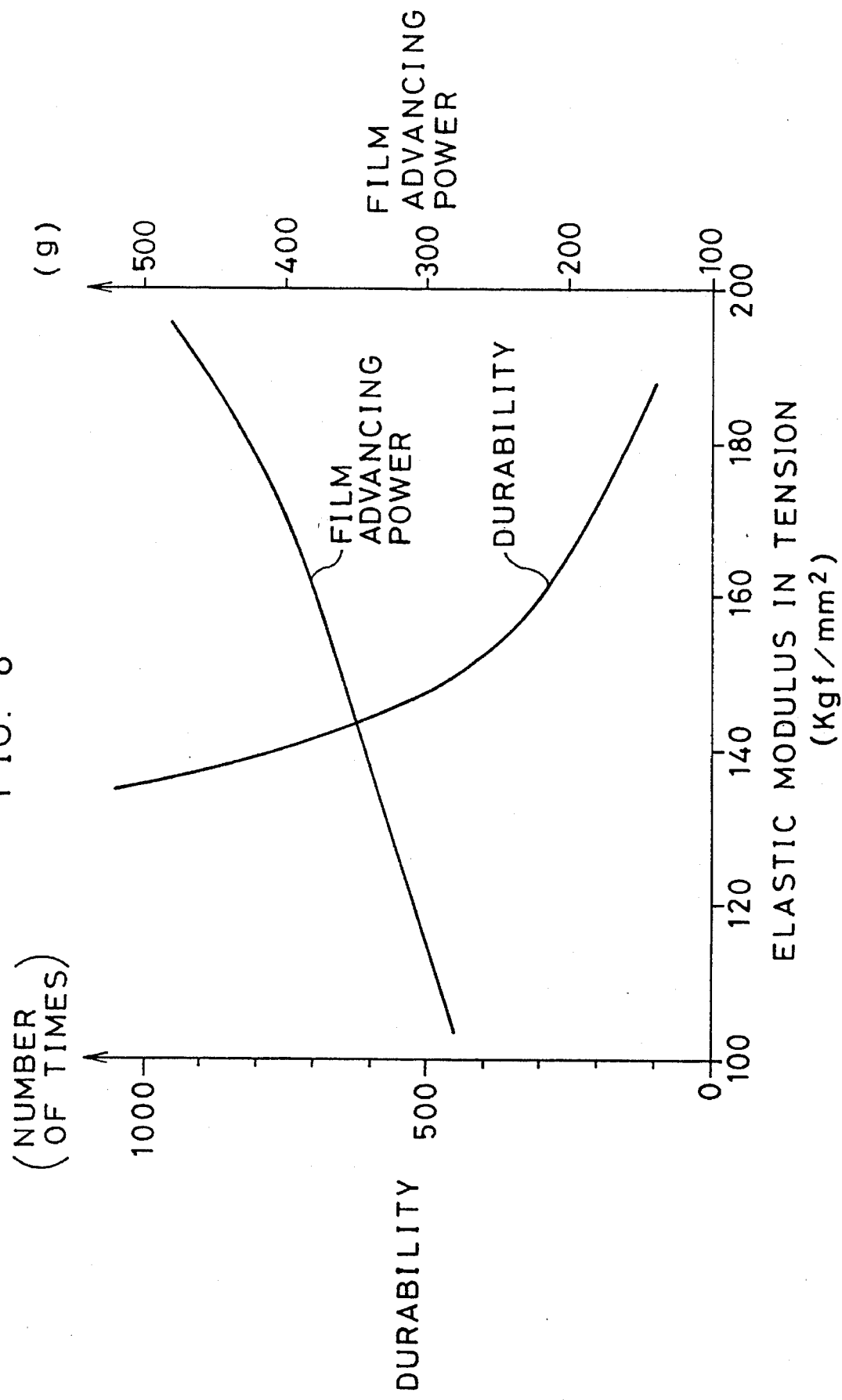
FIG. 8 is a graph showing the relationship between elastic modulus in tension, durability and film advancing power of the flange.

As shown in FIG. 7, the elastomer is substantially inversely proportional to the loading of the elastomer. The relationships between the elastic modulus in tension, the durability and the advancing power of the flanges are as shown in FIG. 8. As the elastomer increases, the advancing power gently increases, but the durability sharply decreases.

According to the test result, it was proved that Examples 1 to 8 were superior to Comparisons 1 to 4 in the overall point standings of durability, folding endurance and advancing power.

Regarding the weight ratio of PS resin to PPE resin, durability, folding endurance and advancing power increase as the parts of PPE resin increases. But too much PPE resin results in bad moldability, and it becomes hard to form satisfactory flanges. Therefore, it is better to limit the PS/PPE ratio to 10/90. On the contrary, as will be seen from Comparison 2, if the parts of PPE resin is too small, durability, folding endurance and advancing power would not be satisfactory. In view of the foregoing, the weight ratio of PS resin to PPE resin should be from 60:40 to 10:90, and preferably from 40:60 to 20:80.

Comparing Example 1 with Comparison 1 shows that the elastomer loading has large influence on durability and folding endurance. However, in Comparison 3 where 20 parts by weight of elastomer was loaded, the film advancing power was less than 280 g, through the durability and the folding endurance were the best of all. Therefore, Comparison 3 is not suitable for the flange material of the film cassette. In view of the foregoing, the elastomer loading should be from 6 to 19 parts by weight, and preferably from 8 to 16 parts by weight, per 100 parts by weight of the PS/PPE resin mixture.

Also an experiment was carried out on each type of the above-described samples to check resin particles produced from the frictional surfaces between the flange and the cassette shell. The production of the resin particles was checked after of 50, 100 and 300 of the above-described film advancing operations of the film cassette. As a result, it was found that the amounts of resin particles of Examples 1 to 8 were remarkably reduced, comparing with those of Comparisons 1 to 4.

Another experiment was performed on each sample to check the noise generated during winding the filmstrip into the cassette shell. The noise was measured at a distance of 15 cm from the cassette shell. The noise was 75 dB in Comparison, while the noise was 60 to 65 dB in either of Examples 1 to 7. Especially in Example 8, as being loaded with silicone, not only was the noise reduced to 57 dB, but also the wearing resistance was improved in comparison with Example 1, and thus the production of resin particles was completely restrained.

From the experimental data noted above, it was proved that the resin composition composed by mixing PS resin with PPE resin in a weight ratio from 60:40 to 10:90, and mixing 6 to 19 parts by weight of elastomer per 100 parts by weight of the PS/PPE resin mixture is suitable for the flange material of the leader advancing type film cassette, as it satisfies all the requirements of the flange: durability, folding endurance and film advancing power. It is preferable to add silicone as lubricant to the resin mixture.

Figure 9:
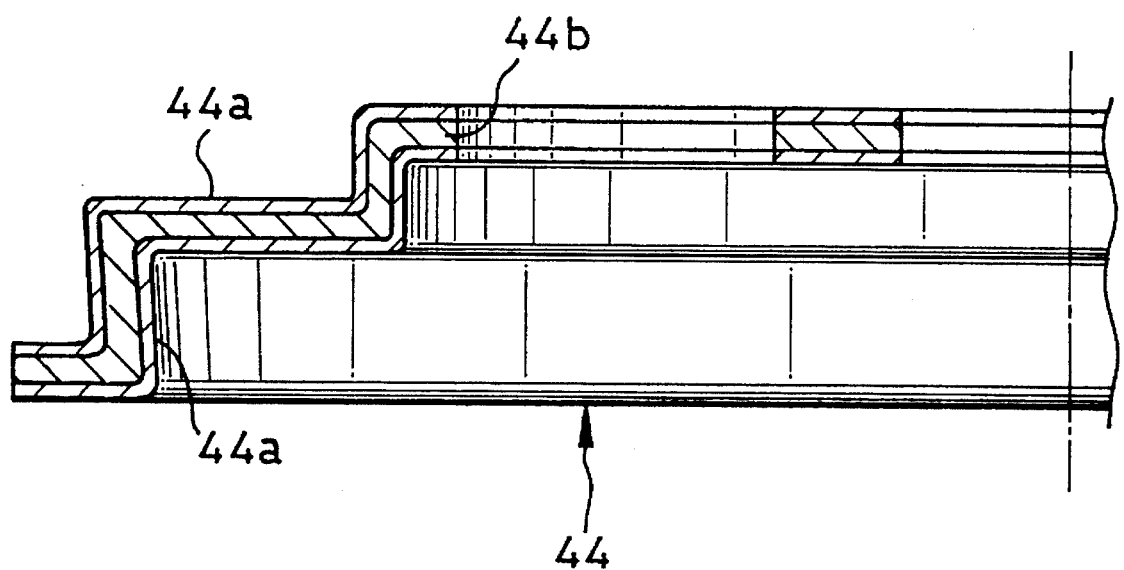
FIG. 9 is a fragmentary section of a flange according to another embodiment of the invention.

Although the above-described embodiments relate to a case where the whole flange is formed from an identical material, it is possible to use different resin compositions as a material of a flange. For example, as shown in FIG. 9, a flange 44 may have a three-layer laminated structure. In this embodiment, outer layers 44a of the flange 44 have a different resin composition from that of an inner layer 44b. Specifically, the outer layers 44a contains PPE resin at a higher ratio than the inner layer 44b. Accordingly, the outer layers 44a, which slide on or rub against the cassette shell and the photographic filmstrip, will not easily be worn out, so the durability of the flange is still more improved, and the frictional damage on the filmstrip is minimized. On the other hand, the parts of PPE resin in the inner layer 44b is so small that the stiffness of the flange in total is kept in a fitting range.

To form the flange 44, a laminated web extruder having a three-layer lamination system is applicable, wherein a three-layer laminated web is formed by extruding simultaneously three layers 44a and 44b from respective resin compositions. Then, the three-layer laminated web is rolled and placed in a flange forming apparatus, e.g., the vacuum forming apparatus as shown in FIG. 5.

When forming the laminated web by extrusion, it is possible to recycle the flanges 44 after use as part of resin composition for the inner layer 44b, while using new product of resin composition for the outer layers 44a. Since only the outer layers 44a are required to be antistatic, wear resistant, smooth and opaque, it is unnecessary to load additive agents in the resin composition for the inner layer 44b. Therefore, this embodiment is preferable in view of reduction of industrial waste as well as material cost. The flange or the web for forming the flange may have more than three laminated layers.

Although the present invention has been described with respect to the film cassette shown in the drawings, the invention is applicable to other types film cassettes, e.g., those wherein the flanges are secured to the spool, or formed integrally with the spool. In the latter case, the spool may be formed from the same resin composition as the flanges. The flange may have shapes other than the illustrated embodiment. The spool itself may be an assembly. For example, the spool can be constituted of two parts which are axially movable relative to each other, as disclosed in U.S. Pat. No. 4,846,418.

Thus, the present invention is not to be limited to the above-described embodiments but, on the contrary, variations and modifications can be effected by a person of ordinary skill in the art without departing from the scope of the invention.

What is claimed is:

1. In a photographic film cassette comprising a spool rotably mounted in a cassette shell, a filmstrip being coiled about the spool into a roll, and capable of advancing a film leader out of the cassette shell by rotating the spool in an unwinding direction, the improvement wherein a pair of flanges having improved durability, which are mounted on the spool to come into contact with end faces or outermost convolution of the film roll, are formed from a material comprising a polyphenylene ether resin composition, which is composed by mixing styrene resin with polyphenylene ether resin in a weight ratio of styrene resin to polyphenylene ether resin from 60:40 to 10:90; and mixing 6 to 19 parts by weight of elastomer per 100 parts by weight of said mixture of styrene resin and polyphenylene ether resin; wherein said material of said flanges further comprises 0.03 to 3 to parts by weight of dimethyl-polysiloxane particles having an average particle diameter of 20 to 1 μm, per 100 parts by weight of said polyphenylene ether resin composition.

2. A photographic film cassette as recited in claim 1, wherein said elastomer includes at least an elastomer component which is selected from the group consisting of conjugated diene elastomer, styrene-conjugated diene copolymer elastomer, hydrogenated styrene-conjugated diene copolymer elastomer, ethylene-α-olefin copolymer elastomer, and ethylene-organic acid ester copolymer elastomer.

3. A photographic film cassette as recited in claim 1, wherein said material of said flanges has an elastic modulus in tension in a longitudinal direction from 105 kg/mm$^2$ to 180 kg/mm$^2$ according to the standard JIS (Japanese Industrial Standard)-K6732 and a folding endurance that is 1000 times or more according to the standard JIS-P8115.

4. A photographic film cassette as recited in claim 1, wherein said styrene resin has a weight-average molecular weight from 100,000 to 400,000 Mw (measured by GPC), a molecular weight distribution from 1.5 to 7, an elastic a melt flow rate from 1.0 g to 25 g per ten minutes (JIS-K7210, at 200° C. and under a 5 kg load).

5. A photographic film cassette as recited in claim 1, wherein said material of said flanges comprises two or more polyphenylene ether resin compositions which are different in the weight ratio of said styrene resin to said polyphenylene ether resin.

6. A photographic film cassette as recited in claim 5, wherein said flanges have a laminated structure having three layers, wherein an outer layer and a middle layer of said three layers contain said polyphenylene ether resin at a lower weight ratio to said styrene resin in comparison with the inner layer of said three layers.

7. A photographic film cassette as recited in claim 6, wherein said flanges are formed from a laminated web having said three layers.

* * * * *